No. 626,803. Patented June 13, 1899.
T. BRENNAN.
SHOE FOR GRAIN DRILLS.
(Application filed Apr. 18, 1899.)
(No Model.)
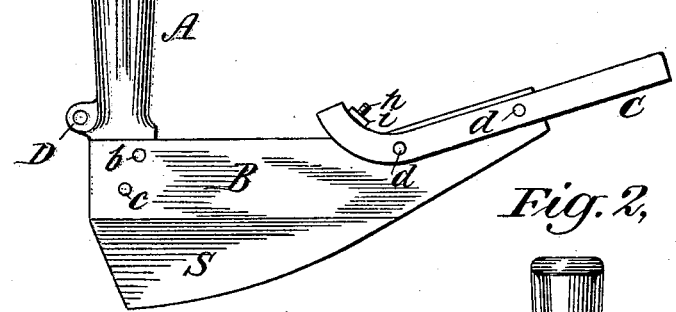
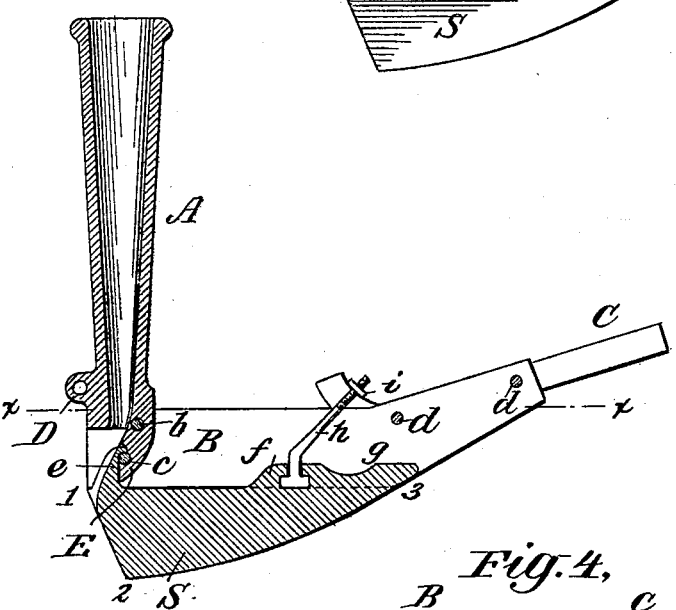
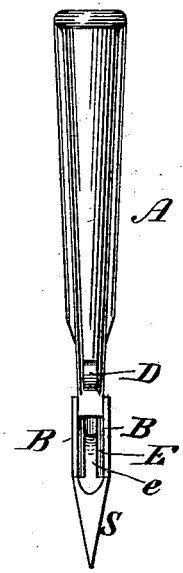
WITNESSES:
D. H. Maynord
J. C. Olsen
INVENTOR
Thomas Brennan
BY
J. N. McIntire
ATTORNEY
THE NORRIS PETERS CO., PHOTO-LITHO., WASHINGTON, D. C.

UNITED STATES PATENT OFFICE.

THOMAS BRENNAN, OF LOUISVILLE, KENTUCKY.

SHOE FOR GRAIN-DRILLS.

SPECIFICATION forming part of Letters Patent No. 626,803, dated June 13, 1899.

Application filed April 18, 1899. Serial No. 713,523. (No model.)

*To all whom it may concern:*

Be it known that I, THOMAS BRENNAN, of Louisville, in the county of Jefferson and State of Kentucky, have invented a new and useful Improvement in Shoes for Grain-Drills; and I do hereby declare that the following is a full, clear, and exact description of the same, reference being had to the accompanying drawings, forming part of this specification.

My invention relates to grain-drills, and particularly to that portion thereof which is generally denominated the "shoe."

Previous to my invention various constructions of grain-drills have been devised, among which is that species in which the shoe or furrow-cutter which is combined with the lower end of the seed tube or hopper is removably secured to the foot of the latter, so that it may be readily detached therefrom for the purposes of sharpening, repairing, or removal, as circumstances may require, and my improved grain-drill relates to this species. In all grain-drills of this species, however, with which I am familiar the removable or detachable shoe or runner is bolted in some way to the lower and solid end portion of the seed-tube, usually to a sort of lateral integral projection thereof, and has its upper edge portion embraced or confined laterally between the lower edges of two side plates, which are usually secured to the said lower portion of the seed-hopper by bolts and to each other by bolts arranged transversely to the vertical plane in which lies the drill tube or hopper; but in all such prior forms of grain-drill having removable shoes or runners the principle of construction and mode of operation are such that the detachable shoe is not held in working condition so securely as it should be, especially against any strains to which it may be subjected when the runner may contact with or impinge against any obstruction that tends to move it laterally relatively to the seed-hopper and other connected parts.

I propose to provide for use a grain-drill of the species mentioned in which the removable or readily-detachable shoe or runner will be more rigidly and securely held in its working condition, while at the same time it can most easily and conveniently be detached from and reattached to the seed-tube and the side plates permanently connected therewith; and to these main ends and objects my invention may be said to consist, first, in the combination with a seed tube or hopper having its lower end portion bifurcated or formed with a vertical slot or mortise and a shoe or runner formed or provided at its rear end portion or heel with an upwardly-projecting tongue or mortise-like device, which engages with the bifurcated portion of the seed-tube in such manner that the combined devices will be securely held in place relatively in a lateral direction when secured together in a longitudinal direction, all as will be hereinafter more fully explained and as will be most particularly pointed out in the claims of this specification; second, in the combination, with a seed-tube and a removable shoe or runner provided with means for holding them in an assembled condition laterally and side plates permanently fastened at their rear ends to said seed-tube and at their forward ends to each other, of means for securely holding the said shoe in place longitudinally, all as will be hereinafter more fully explained and as will be most particularly pointed out in the claims of this specification; third, in the combination, with a seed-tube and shoe or runner adapted to be coupled and uncoupled by a substantially longitudinal relative movement and side plates secured at their rear ends to the lower portion of said seed-tube and running convergently thence toward their forward ends, of means for longitudinally drawing and holding together the said shoe and the said convergent side plates, and an upward projection or projections on the said shoe operating to fit snugly between the inner faces of the said side plates or to be wedged home between them when the parts are secured in place, all as will be hereinafter more fully explained and as will be most particularly pointed out in the claims of this specification, and, fourth, in certain specific structural features that will be found hereinafter fully described and that will be specifically pointed out in the claims of this specification.

To enable those skilled in the art to make and use grain-drills embodying either in whole or in part the said structural features of my invention either in the precise form or forms as to one or more of said features in which I show my invention carried into effect or under some modification of the same, I will now proceed to more fully describe my improvements, referring by letters and numerals to the accompanying drawings, which make part of this specification and in which I have shown my invention carried out in the precise form of grain-drill in which I have so far practiced it.

In the drawings, Figure 1 is a side elevation of so much of a grain-drill as need be shown to fully illustrate my invention. Fig. 2 is a rear elevation of the same. Fig. 3 is a vertical central longitudinal section of the same. Fig. 4 is a detail horizontal or cross section taken in a plane indicated by the dotted line $x\ x$ at Fig. 3 with the shoe removed. Fig. 5 is a bottom view of the assembled parts. Fig. 6 is a top view of the removable shoe or runner detached.

In the several figures the same part will be found always designated by the same reference letter or numeral.

A is the seed tube or hopper, while B B are two side plates, which, as shown, are securely riveted at $b\ c$ or otherwise fastened to the approximately vertical flat sides of the lower portion of the said seed-tube and which at their convergent forward ends contact with each other for some distance and are, where they thus come together, embraced between the hind end portions of the duplex metallic drag iron or bar C, the parts of the device C and the two contiguous side plate portions being firmly riveted together, as shown, by rivets $d\ d$, all as clearly shown in the drawings. The seed tube or hopper (which, as usual, is formed or provided with the loop or eye D of the pendent chain attachment of the machine) has its lower end portion shaped, as seen, (see particularly Figs. 2 and 3,) to form a depending fork or a bifurcated footpiece E, through the "tines" of which fork, so to speak, passes the lower one, $c$, of the two before-mentioned rivets, which secure the rear portions of the side plates B B to the said forked foot-like part of the hopper, and the body of this lower rivet $c$ serves to perform the function of one member of the coupling device by which the rear end or heel portion of the runner or shoe of the drill is attached to the said foot-like lower end of the seed-tube, as will be presently described.

S is the detachable shoe or runner, the peculiar shape or construction of which will be readily comprehended from an inspection of the drawings and attention to the following brief explanation: It is made, preferably, of cast-steel or of sufficiently hard stock to answer the practical purposes of the furrow-cutter of a grain-drill, has its two approximately vertical surfaces, that are exposed to view below the contacting lower straight edges of the side plates B B, of about the configuration seen at Fig. 1, has its rearmost (underwardly-inclined) surface of about the shape seen at Fig. 2, and has its top surface, that lies in a plane coincident with that in which lie the lower straight edges of the said side plates, shaped as seen at Fig. 6, while its approximately flat vertical surfaces extending downwardly from the perimeter of its wedge-shaped top surface meet to form the cutting or knife edge seen at 1 2, Fig. 5, the stock being shaped or disposed from the point 2 in said figure in the manner shown, so as to permit the formation of the tenon-like bottom teat 3, that is seen to lie in between the adjacent slightly-separated inner faces of the side plates.

As will be clearly seen by reference to Figs. 3, 4, and 6, the shoe S is formed with an upwardly-projecting curved tongue or mortise-like device $e$, that preferably is slightly hollowed out or grooved on its rearmost edge and the upper forward curved end of which is hook-shaped to adapt it to overlie or partially embrace the body of rivet $c$, as best seen at Fig. 3. Said shoe also has the upward projections $f$ and $g$, (see Figs. 3 and 6,) which in top view show vertical sides, which converge at the forward end of $g$ to almost an edge, the lower oblique portion of said narrowed foremost part of the stock constituting the part marked 3 at Fig. 5 and hereinbefore alluded to. The space between the adjacent end portions of these two upward projections $f$ and $g$ of the stock of the shoe is of such shape or conformation, it will be seen, (see Fig. 3,) as to accommodate and just fit around about the head of a draw-bolt $h$, which lies intermediately of the two side plates B B, with its threaded end located between the two rearmost upturned ends of the duplex bar C and protruded forwardly beyond them sufficiently to permit the nut $i$ when turned onto the said threaded end to come to a bearing on the forward surfaces of the said upturned portions of the drag-iron, all as plainly shown in the drawings. As illustrated, these turned-up portions of the bars C should have their forward edges or surfaces lie in a plane approximately transverse to the line of direction in which the draw-bolt $h$ runs, so that the nut $i$ will come to a proper bearing at its base, and in the case shown the arrangement of parts is such, it will be seen, that the draft-line of the draw-bolt $h$ is almost parallel with the base-line of the oblique portion of the side plates B B. Approximately this arrangement is desirable, because thereby in assembling the parts shown the bolt $h$ when drawn obliquely forward by screwing up the nut $i$ will draw home the shoe S, so that its hook-like tongue $e$ will come to a solid bearing on the rivet-pin $c$, so that the straight or flat upper portions of the shoe-top will come to a perfect and forcible bearing against the straight lower edges of the side plates B B and so that the forward end of the wedge-shaped upward projection or lug $g$ of the shoe will be drawn home snugly and forcibly into the correspondingly (or nearly so) shaped space between the convergent forward portions of the side plates, or, in other words, so that the tapering forward end of lug $g$ will be wedged tightly in between the said convergent portions of the said side plates. By reason of the shown and described configurations of these parts and their arrangement together in the manner shown, or by reason of an equivalent shaping and arrangement of these parts, I am enabled, it will be understood, by the use of the single draw-bolt $h$ when the parts shall have been properly placed in juxtaposition to temporarily fasten in place the shoe S in such a rigid or firm manner that the concrete grain-drill device will be as strong as if the shoe and other parts were permanently united in the strongest possible manner. At the same time by the manipulation simply of the draw-bolt $h$, or, in other words, by simply removing and properly replacing a single nut $i$, which any person unskilled in mechanics and the use of tools can easily do, the removal and replacement of the detachable shoe may be effectuated.

It is to be seen (see particularly Figs. 4 and 6) that the sort of wedge-shaped or tapering upward projections $f$ $g$ apparently fit tightly within and perfectly conform to the wedge-shaped space (in horizontal section) between the convergent inner surface of the side plates B B; but it will be understood that in practice there should be such slight discrepancy in shape between the male and female members, so to speak, of the jointure between the sides of lugs $f$ and $g$ and the inner faces of plates B B that in drawing home the shoe S the parts $f$ $g$ will have a chance to wedge tightly in place, and thus come to a forcible fit with the said side plates by the time the hook-like tongue shall have come into forcible contact with the pin $c$ of the foot-piece of the hopper. As this tongue or tenon-like projection $e$ of the shoe has no other motion relatively to the foot-piece E than one in a plane perfectly coincident with the parallel planes in which lie the surfaces of the bifurcation of the foot-piece E, it follows that the tongue $e$ may be made to perfectly fit widthwise this bifurcation, and hence when drawn home into the working position the removable shoe S will be rigidly and very securely held in place at the vicinity of its heel by this tongue $e$, embraced laterally by the bifurcation of the foot-piece E.

Preferably the rear-end surface of the shoe is inclined underward, as shown, to bring the rearmost point of its knife-edged base slightly in advance of the vertical line in which the seed will drop from the lower end of the seed-tube and to prevent any obstructions to the falling seed by any accumulation of soil on the rear end or heel of the shoes, as might occur were it vertical.

The rear ends or edges of the side plates B B extend back beyond the locality of the lower end of the discharge-orifice of the seed-tube sufficiently, it will be seen, to act as wind-guards to prevent any undue or avoidable scattering laterally of the seeds by side drafts that might interfere with the proper discharge of all the seed within the furrow or trench cut by the grain-drill runner.

Various modifications may of course be made in the details of construction shown, which so long as they do not change the novel characteristics of my improved grain-drill will come within the scope of my invention, and in carrying out the latter, though I prefer to make the grain-drill in all respects substantially as I have shown and described it, a part only of my invention may be used alone with more or less advantage to the user. I therefore wish it to be understood that I do not restrict myself to either a construction of grain-drill embodying all of the structural features claimed that may be segregable from the rest nor to the precise form shown as to any one of the claimed novel features of my machine; but, Having now so fully shown and described my improved grain-drill that any one skilled in the art can make and use a machine embodying either in whole or in part my invention and one embracing one or all the parts of my invention in either the precise form (as to one or more of the novel features) that I have shown or in some modified form, what I claim as new, and desire to secure by Letters Patent, is—

1. The combination, with a seed-tube, having its lower end portion bifurcated, and provided with a pin arranged transversely of said bifurcation, of a removable shoe, or runner, formed, or provided, with an upwardly-projecting, mortise-like, device, adapted to hook over, or overlie, the said pin; whereby, when the said shoe is held in engagement with said tube, longitudinally of the former, the combined parts will be securely held against any relative movement, laterally: as hereinbefore set forth.

2. The combination, with a seed-tube having a bifurcated foot portion; and a detachable shoe, provided near its rear upper portion with a projection which engages with said bifurcated foot, as specified, of means for drawing into and holding in place, longitudinally, the said shoe; all substantially as and for the purposes set forth.

3. The combination, with a seed-tube, and a shoe, or runner, adapted to be coupled thereto and uncoupled therefrom by a substantially longitudinal relative movement; and side plates, secured at their rear ends to the lower portion of said tube and running thence convergently forward, of means for drawing and holding together said shoe and side plates, in an approximately longitudinal direction; and an upward projection (or projections) on the said shoe which fits (or fit) snugly between the said side plates and is (or are) wedged home tightly between the convergent surface of said plates; all in substantially the manner and for the purposes set forth.

4. The combination of the bifurcated seed-tube foot provided with a pin such as at $c$; a detachable shoe having a hook-like tongue $e$, and projections as at $f$, $g$; side plates B, B; a draw-bolt, as at $h$; and a suitable bearing, or abutment, for the nut of said draw-bolt; the whole arranged to operate in substantially the manner and for the purposes set forth.

In witness whereof I have hereunto set my hand this 1st day of April, 1899.

THOMAS BRENNAN.

In presence of—
J. A. O. BRENNAN,
R. E. BRENNAN.